Feb. 14, 1933.  A. MEYER  1,897,175
AUTOMATIC FLAT BOTTOM UNLOADING DEVICE
Filed Nov. 8, 1929
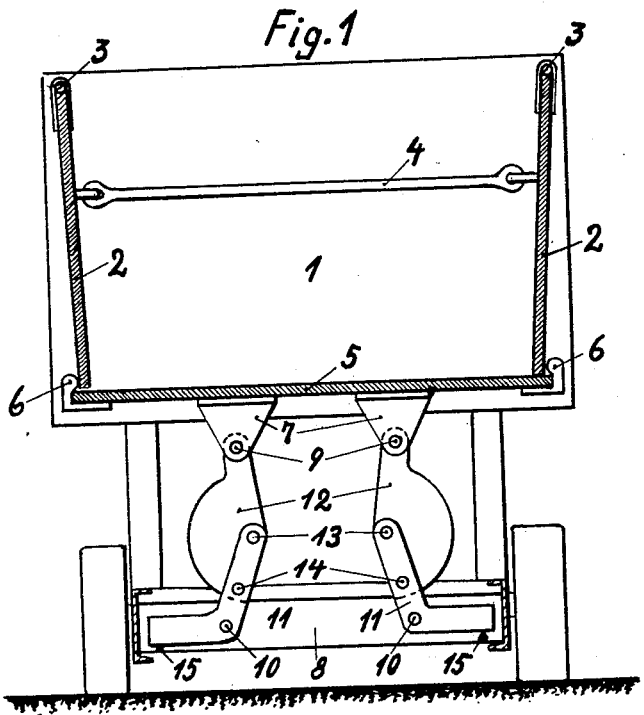
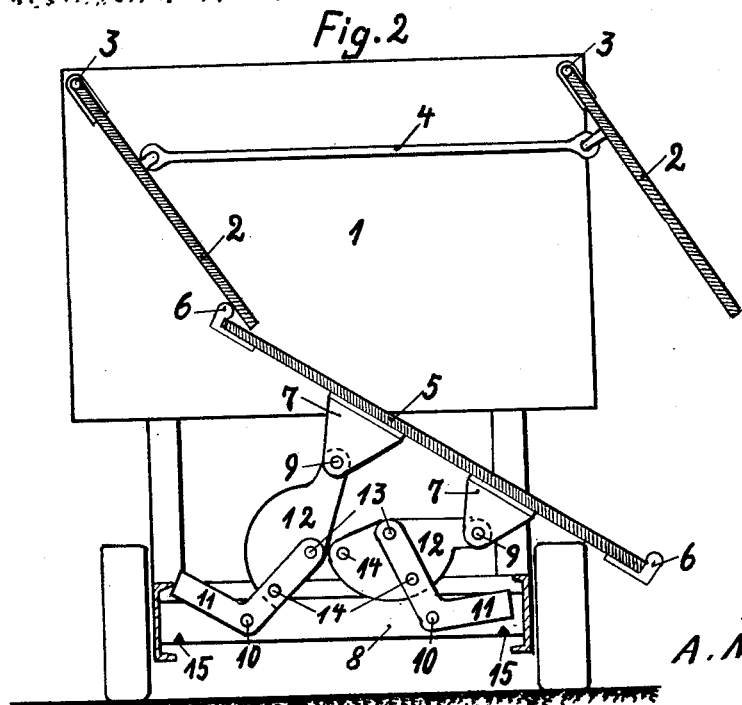
Inventor
A. Meyer Patented Feb. 14, 1933

1,897,175

UNITED STATES PATENT OFFICE

ARTHUR MEYER, OF HAMBURG, GERMANY

AUTOMATIC FLAT-BOTTOM UNLOADING DEVICE

Application filed November 8, 1929, Serial No. 405,830, and in Germany November 9, 1928.

This invention relates to improvements in dump cars.

The object of the invention is to provide a dump car with means whereby, upon release of an interlocking element, the car body is automatically tilted to unloading position.

In the accompanying drawing:—

Figure 1 is a transverse section of a dump car, with the parts in normal position.

Figure 2 is a similar view showing the parts in unloading position.

1 indicates a car body formed with fixed ends and swinging sides 2—2 hinged at their upper ends at 3—3. The numeral 5 indicates the bottom of the car body, and at the outer edges thereof are cleats 6—6 to hold the sides in closed position when the car is in normal position, and to swing the sides when the car is tilted. The sides 2—2 are connected together by a flexible connection, as at 4.

The car body is mounted on an under frame supported on longitudinal sills, connected by a transverse brace 8, wheels being mounted on the sills in the usual way. Pivoted to the transverse brace 8, at 10—10, on opposite sides of the center are bell crank levers 11—11, the horizontal arms of which normally rest on supports 15—15, while the vertical arms are pivoted at 13—13 to a pair of levers 12—12. The levers 12—12 are pivoted at 9—9 to plates 7—7 depending from the bottom of the car.

Pins 14—14 pass through openings in the bell crank levers 11—11 and the levers 12—12 to form a lock between the parts to hold the car body in loading position, as shown in Figure 1.

The relative position of the pivots 9 and 10 is such that when a pin 14 is removed, the weight of the load in the car will move the levers 11 and 12 and tilt the car bottom and rock the sides and deliver the load. For instance, as shown in Figure 2, pin 14 on the right of the center of the car is shown removed. The levers 11 and 12 held by this pin then rock inwardly on their respective pivots, the car body is tilted at an angle, and the left hand cleat 6 moves the adjacent side 2 on its pivot, and through the flexible connection 4, the opposite side 2 is swung outwardly. While the levers 11 and 12 on the right hand side break joint to allow the car body to tilt, the levers 11 and 12 on the left hand side, through the medium of the connecting pin 14, remain locked together and move as one, the lever 11, however, rocking on its pivot 10.

It is obvious from the foregoing description that the car body and its load is retained in normal loaded position by the interlock between the levers, and that by breaking the interlock of one or the other of the levers, the weight of the load automatically dumps the load to one or the other side of the car, depending entirely upon which pin 14 is withdrawn. Furthermore, it will be seen that the cleats 6 serve a dual purpose, in that they retain the sides in place at the lower ends when closed, while when the car body is tilted, one of the cleats engages one of the sides and through the flexible connection 4 the opposite side of the car is opened to permit the load to slide from the car bottom, as clearly shown in Figure 2. To restore the car body to normal position, the lower tilted end is elevated and the pin is inserted in the aligned openings in the levers.

What I claim is:—

1. A dump car including a car bottom, a frame, levers pivoted to the frame on opposite sides of the center thereof, levers depending from the car bottom on opposite sides of the center thereof and pivoted thereto, said latter levers having pivotal connection with the levers pivoted to the frame, and interlocking means for connecting the levers on the frame and the levers depending from the car bottom to hold the car body in loading position, the levers pivoted to the frame being held at an angle to the vertical when connected with the levers depending from the car bottom by said interlocking means whereby to normally present a discharge moment of the body on release of the interlocking means.

2. A dump car comprising a body including a tilting bottom and pivoted sides, the bottom having cleats on the edges to cooperate with the pivoted sides to hold same in loading position and to move the sides when the car bottom is tilted, a frame, levers pivoted to the frame and extended upwardly, levers pivoted to the car body and to the levers pivoted to the frame, and locking means for securing the two sets of levers together to hold the car body in loading position, said locking means holding the levers pivoted to the frame at an angle to the vertical with respect to the levers pivoted to the car body to thus normally maintain the levers under a break-joint influence operative on release of said locking means.

3. A dump car comprising a car body having a tilting bottom, a frame, upper depending levers pivoted to the under side of the tilting bottom, lower levers pivoted to the frame, pivots connecting the upper ends of the lower levers to the upper levers, said last mentioned pivots being disposed toward the center of the car and out of vertical alignment with the pivots connecting the upper and lower levers with the car body and the frame respectively, and means interlocking the upper and lower levers to hold the car body in loading position, whereby if and when said interlocking means is released the weight of the load in the car body will tilt the car body.

In testimony whereof I affix my signature.

ARTHUR MEYER.